June 11, 1957 F. H. MUELLER 2,795,437
REMOVABLE GUIDE AND SUPPORT SLEEVE FOR METER NUTS
Filed May 17, 1955
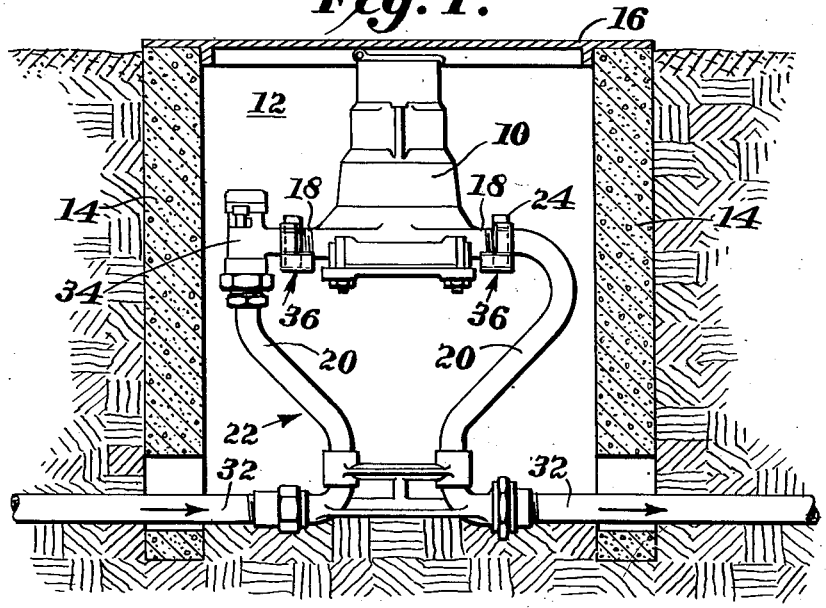
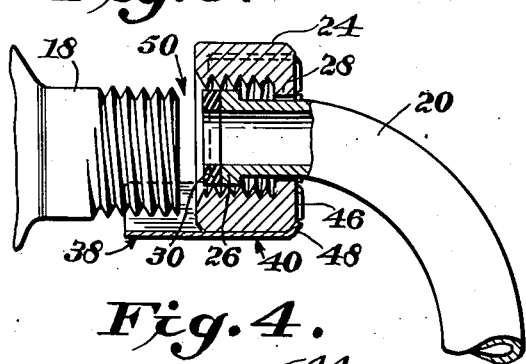
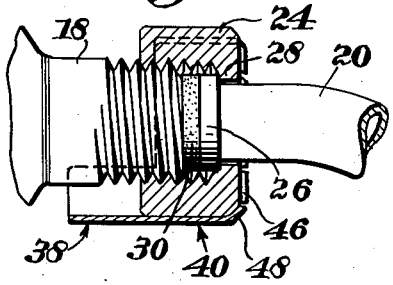
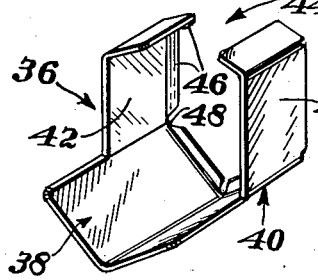
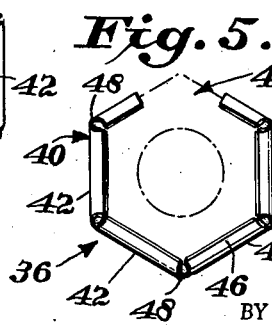
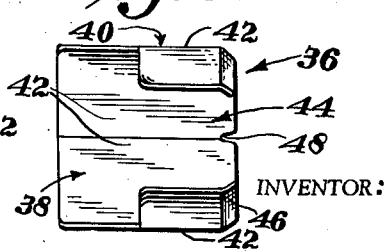
INVENTOR:
Frank H. Mueller,
BY Cushman, Darby & Cushman
ATTORNEYS.

United States Patent Office 2,795,437
Patented June 11, 1957

2,795,437

REMOVABLE GUIDE AND SUPPORT SLEEVE FOR METER NUTS

Frank H. Mueller, Decatur, Ill., assignor to Mueller Co., Decatur, Ill., a corporation of Illinois Application May 17, 1955, Serial No. 508,902

1 Claim. (Cl. 285—23)

This invention relates to attachments for nuts and more particularly to an attachment for use with a coupling nut to support a pipe end or nipple and guide the nut thereonto. While the present invention may be used where joining ordinary pipe ends with a coupling nut, its primary value is as a supporting and guiding means in installing or replacing fluid meters.

It is often the case that such metering devices, particularly water meters, are placed in relatively inaccessible locations, such as a well or box in the ground, which makes it most difficult for a workman to support the meter with one hand while attempting to connect it to the supply lines with the other hand. Even if a workman should be able to support the meter, the working area often is so cramped that he is unable to accurately align the ends of the spuds and pipe ends to be coupled. Thus, installation under these conditions not only is unnecessarily time consuming but also can lead to the damaging of expensive equipment.

In the past, the problem has been somewhat alleviated through the use of saddle nuts; a saddle nut being essentially an ordinary coupling nut which has a longitudinally extending integral ledge or lip at its threaded end upon which a meter spud or nipple rests prior to tightening the nut. It will be appreciated therefore, that the manufacturing problems and consequently, manufacturing costs, are multiplied by the addition of the ledge-like saddle to the nut. Not only is the initial cost of manufacturing saddle nuts greater than that of ordinary coupling nuts, but also the possibility of mitigating the cost to a large user is extremely slight, since the saddle nut remains in position and cannot be used in subsequent installations.

It is, therefore, an object of this invention to provide a saddle attachment for use with a coupling nut that will support the pipe end or nipple onto which the nut is to be threaded.

It is another object of this invention to provide a saddle attachment for use with a coupling nut for accurately aligning the nut with the pipe or nipple onto which the nut is to be threaded.

It is another object of this invention to provide a saddle attachment for use with coupling nuts that may be detached, after the nut has been threaded onto a nipple or pipe end, and used for another installation.

It is a further object of this invention to provide a detachable saddle attachment for a coupling nut that is of simple design with consequent manufacturing economies.

Other objects and advantages of this invention will be in part obvious and in part explained by the following specification and drawings in which:

Figure 1 is a fragmentary vertical sectional view through a meter box showing a conventional water meter located therein and mounted upon a meter setter equipped with coupling nuts provided with saddle attachments constructed in accordance with the present invention;

Figure 2 is an enlarged fragmentary elevational view, partly in vertical section, through the right hand meter spud and nut coupled thereto shown in Figure 1;

Figure 3 is a view corresponding to Figure 2, but illustrating the position of the parts before connection of the nut to the spud and with the attachment supporting the latter;

Figure 4 is a perspective view of a saddle attachment for a coupling nut embodying this invention;

Figure 5 is an end view of the attachment shown in Figure 4; and

Figure 6 is a top plan view of the attachment shown in Figure 5.

Referring more particularly to the drawings, there is shown in Figure 1 a conventional water meter 10 located in a ground box 12 having side walls 14 and a removable cover 16. Exteriorly threaded inlet and outlet spuds or nipples 18 on the meter 10 are connected to the gooseneck conduits 20 of a conventional meter setter 22 by conventional coupling nuts 24 carried on the meter-connecting ends of such conduits. These latter ends have conventional exterior circumferential enlargements or flanges 26 (Figure 2) for engagement with interior circumferential flanges 28 at one end of the nuts 24. Preferably a sealing washer 30 is interposed between the opposed ends of the nipples 18 and the conduits 20. The other ends of the conduits 20 are in series connection between water supply pipes 32, while one of the conduits 20 may be provided with a valve fitting 34 adjacent the upper end thereof to shut off the flow of fluid through the meter 10 in the event it becomes desirable to remove it for the purposes of repair or replacement. Both of the nuts 24 are shown with supporting and guiding saddle-providing attachments 36, embodying this invention, attached thereto.

The preferred embodiment of such attachment 36 is shown most clearly in Figures 4 through 6 of the drawings. In this embodiment, the attachment 36, which may be stamped from sheet metal, comprises a saddle section 38 forming an integral extension of a clip section 40. The clip section 40 essentially is in the form of a longitudinally-split sleeve having flat sidewall sections 42 conforming to the exterior configuration of a coupling nut 24 and adapted to snugly embrace the latter. The gap or split 44 in the clip section 40 is wide enough to permit the attachment 36 to be received on and removed from a conduit 20 sideways, intermediate the ends of the latter, but narrow enough to prevent radial detachment of the attachment from a nut. The width of such gap 44 usually will approximate the outer diameter of a conduit 20 although it is obvious that due to the resiliency of the material of the attachment 36 and the manner of construction, the attachment can be removed by temporarily spreading the clip section 40 to make the gap larger. To facilitate longitudinal positioning of the attachment 36 on a nut 24 and to inhibit inadvertent or accidental detachment therefrom, that end of the clip section 40 opposite the saddle section 38 is provided with an inturned flange 46 to engage the flanged end of the nut. The flange 46 may be formed by bending the end of the clip section 40 inwardly in the manner shown in Figure 6. To facilitate the formation of the flange 46, small portions of metal have been removed prior to the bending step, leaving the voids 48 between each individual section of the flange 46. The hexagonal shape of the nuts 24 and the corresponding shape of the attachment 36 has been shown by way of illustration, but is not meant to limit the device in any way since it is obvious that any other non-circular cross-sectional shapes may be used.

The saddle section 38 may be formed by an integral extension of two adjacent flat sidewall sections 42 of the clip section 40 to form a substantially V-shaped trough which is made long enough to insure its ability to support a meter spud 18.

In a modified form (not shown) of the invention, the attachment may comprise a clip section alone without a saddle section. In this modification, the clip section would be of greater length than the length of the nut so that the former will extend or project beyond the nut sufficiently for a meter spud to rest on such projection.

The use of the attachment is illustrated in Figure 3 where the meter spud 18 is shown resting on the saddle attachment 36. Before the meter 10 is so positioned, attachments 36 are slipped sideways over both of the conduits 20 and then pushed up and over their nuts 24 to snugly embrace the latter and position the saddle sections 38 in projecting relation with the threaded ends of the nuts. As stated heretofore the flange 46 insures the proper positioning of the attachments 36 on the nuts 24. Each nut 24 is then pushed slightly rearwardly on its conduit 20 to enable the positioning of the meter 10 on the saddle sections 38 for connection to the conduits 20 but leaving a space 50 between the end of the conduit and the threaded end of the nut for the reception of the washer 30. After the weight of the meter 10 is solely upon the saddle sections 38, the meter can be steadied easily with one hand while the washers 30 are installed with the other, as shown in Figure 3, and then each nut 24 is pushed forwardly into engagement with the threads of the corresponding spud 18. The nut 24 is then rotated so that the nut threads engage the threads on the meter spud 18. Such engagement may be facilitated, if necessary, by shifting the meter 10 by the meter steadying hand. By the time the saddle 38 has moved out of supporting engagement with the meter spud 18, the threads of the spud and the nut 24 will have been engaged to thereby support the meter. The screwing operation is continued until the connection becomes fluid-tight, after which the saddle attachment 36 is pushed rearwardly off each nut 24 and removed sideways from the corresponding conduit 20. It thus will be appreciated that with a minimum of two of these attachments 36 a workman may install any number of meters.

The removal of a meter from its position in the line is much the same as the installation. A pair of saddle attachments 36 are first placed on the nuts 24 and the nuts loosened until entirely disengaged from the meter spuds 18 with the weight of the meter still supported on the saddle sections 38. When the disengagement is complete, the meter may merely be lifted from its position on the saddle sections 38 and another meter substituted therefor.

In use of the aforedescribed modified form of the attachment, it will be appreciated that the width of the split therein is narrower throughout its entire length than the diameter of a meter spud, so that the meter cannot be moved directly downwardly or upwardly to rest upon or for removal from the modified attachment. Consequently, in use of the modified form of the invention, it usually will be necessary to spring the gooseneck conduits 20 slightly apart to enable the insertion of one of the meter spuds into the attachment on one of the coupling nuts, and then when the other spud is aligned with the attachment on the other nut, to spring the conduits 20 back towards each other so that the said other spud will be properly supported within and on its corresponding attachment.

It thus will be seen that there has been provided by this invention a structure in which the various objects hereinbefore set forth are successfully achieved. As various possible embodiments may be made of the structural features of the above invention, all without departing from the scope thereof, it is to be understood that all matter hereinbefore set forth or shown in the accompanying drawings, is to be interpreted as illustrative and not in a limiting sense.

I claim:

A demountable saddle attachment for use with hexagonal coupling nuts carried by the gooseneck pipes of a meter setter to support the threaded spuds of a fluid meter when connecting the nuts to the spuds comprising: a relatively flexible sheet metal clip in the shape of a longitudinally split sleeve conforming to the exterior configuration of a hexagonal coupling nut for snugly partially embracing the latter, said sleeve including opposed vertical walls for engaging opposed vertical faces of the nut, a pair of integral oppositely inclined lower walls for engaging the lower inclined faces of the nut each being integral with an associated vertical wall and extending downwardly and inwardly therefrom and a pair of short inclined walls for engaging the upper inclined faces of the nut each being integral with an associated vertical wall and extending upwardly and inwardly therefrom and terminating in spaced relation with respect to each other to form the longitudinal split, the flexibility of said clip and the width of said split being sufficient to permit transverse passage of the associated nut carrying pipe therethrough so that the clip can be moved transversely into surrounding relation to the pipe and longitudinally therealong into embracing engagement with the nut carried thereby, at least one of the walls of said sleeve having a radially inwardly extending portion for engaging a transverse surface of the nut when the clip is moved longitudinally into embracing engagement therewith so as to position the clip in proper longitudinal engagement thereon, the length of at least said pair of integral lower walls being greater than the length of the nut when properly positioned to provide an extended trough-shaped saddle portion for supporting in a transverse horizontally stabilized condition the associated fluid meter spud in a position adjacent the nut to be connected therewith, the length of said short upper walls being not greater than the length of the nut when properly positioned so as to permit the fluid meter spud to be moved downwardly into supporting engagement with said saddle portion.

References Cited in the file of this patent

UNITED STATES PATENTS

| 1,490,024 | Quinn | Apr. 8, 1924 |
| 2,424,682 | Ebert | July 29, 1947 |
| 2,650,837 | Smith | Sept. 1, 1953 |